United States Patent [19]

Niki et al.

[11] 4,181,749

[45] Jan. 1, 1980

[54] PROCESS FOR PRODUCING SURIMI

[75] Inventors: Hiroshi Niki, Ebetsu; Tuneo Katou, Sapporo; Eiki Deya, Sapporo; Toru Doi, Sapporo; Kenkichi Ahiko, Kodaira; Hiromichi Hayashi, Sapporo, all of Japan

[73] Assignee: Snow Band Milk Products Co., Ltd., Sapporo, Japan

[21] Appl. No.: 879,500

[22] Filed: Feb. 21, 1978

[30] Foreign Application Priority Data

Aug. 19, 1977 [JP] Japan .................................. 52/99986

[51] Int. Cl.$^2$ ............................................. A22C 25/00
[52] U.S. Cl. ..................... 426/643; 426/574; 426/478
[58] Field of Search ......................... 426/643, 574, 478

[56] References Cited

U.S. PATENT DOCUMENTS

| | | | |
|---|---|---|---|
| 3,493,391 | 2/1970 | Pottie | 426/643 |
| 3,707,381 | 12/1972 | Sharp | 426/643 |
| 3,922,372 | 11/1975 | Hasegawa | 426/643 X |
| 3,955,011 | 4/1976 | Niki et al. | 426/643 |
| 3,959,517 | 5/1976 | Niki et al. | 426/643 |

*Primary Examiner*—Robert A. Yoncoskie
*Attorney, Agent, or Firm*—Stevens, Davis, Miller & Mosher

[57] ABSTRACT

Surimi suitable for the production of Kamaboko (fish meat jelly) can be obtained at high yield by compounding (1) a salt-soluble protein fraction prepared by mincing fish meat taken from raw fish into a sol-form, water-washing the resulting sol and dewatering and then subjecting the same to a salt-solution treatment, with (2) heat-denaturated water-soluble protein fractions prepared by heating to coagulation water-soluble protein fractions leached out in the water-wash and salt-solution treatment.

3 Claims, No Drawings

PROCESS FOR PRODUCING SURIMI

BACKGROUND OF THE INVENTION

This invention concerns a process for producing fish surimi wherein water-soluble proteins as well as salt-soluble proteins in fish meat are utilized.

The term "surimi" used herein means fish meat minced into a sol-form.

It is well-known that the Kamaboko-forming ability of fish meat depends upon the content of actomyosin in the fish meat, usually referred to as a salt-soluble protein and generally amounting to about 60% by weight of the total proteins in the fish meat (please refer, for example, to Bull. Jap. Chem. Soc. 63, 1081–1084 (1942)). Accordingly, it has heretofore been proposed to prepare raw materials for the production of fish meat jelly products by separating actomyosin from the fish meat through extraction (refer to Japanese Patent Publication 18583/1971).

It has also been well-known that water-soluble proteins contained in the fish meat (about 30% of the total proteins in the fish meat) diminish the Kamaboko-forming ability, that is, elasticity (please refer, for example, to Bull. Jap. Soc. Sci. Fish, 30, 255–261 (1964)). It has thus been conventional practice in the production of the fish meat jelly products to prepare surimi having a high Kamaboko-forming ability by thoroughly washing fish meat raw materials with water thereby removing the water-soluble proteins.

The proteins which are removed with the above water-washing, however, amount to as much as 30–50% of the total proteins in the fish meat before the water-washing treatment, which decreases the yield in the production of the surimi and causes water pollution.

BRIEF SUMMARY OF THE INVENTION

In view of the foregoing, we have made a study on the improvement in the yield of the surimi to be used as raw materials for the production of the fish meat jelly products such as Kamaboko and, as the result, have found that water-soluble proteins in fish meat can be removed more effectively by physical and chemical destruction of myofibrils contained in raw fish meat and then washing with water, and that the surimi yield can significantly be increased by not discarding but recovering the water-soluble proteins thus removed, heat-denaturing them and compounding the denatured proteins with the salt-soluble protein fractions obtained from the above water-washing treatment, with no degradation at all in the resulting surimi.

Accordingly, an object of the present invention is to provide a process for producing surimi of a high quality in a high yield by effectively utilizing the water-soluble proteins in the fish meat.

It is a further object of the present invention to provide a process for producing surimi of a satisfactory quality from fish meats which have hitherto been considered unsuitable for the production of the surimi by ordinary methods and even from the fish meats of a degraded freshness.

DETAILED DESCRIPTION OF THE INVENTION

Fish meats usable in the present invention as raw material include those of both fresh and frozen fishes of white and red muscles, as well as those of wide variety of other marine animals such as cattlefish, shell fish, krill and the like.

In practicing the present invention, strained fish meat is mechanically minced together with 1–5 times by weight of water added thereto. The meat is finely minched in a colloid mill, a ultrafine pulverizer or a homogenizer so that myofibrils in the meat are rendered into a sol form, preferably, 100 micron in size. The myofibril sol thus prepared is centrifugally separated and the supernatant liquid is recovered, while the solids portion is washed with 1–5 times by weight of water. Two or more water-washings may be applied if necessary.

Then, after the above water-washing, a salt solution is added to and well-mixed with the solids portion (myofibrils). The salt solution may be an aqueous solution of sodium chloride, potassium chloride or the like, an aqueous solution of sodium chloride or brine being usually preferred. Upon addition and admixture of the above salt solution, it is desirable to adjust the ionic strength to about 0.45–0.6 and pH value to about 7.0–8.0. It is also preferable to effect the above mixing with stirring at a temperature kept between about 2°–10° C. The myofibril structure is destroyed by the mixing to provide better removal of the water-soluble proteins. Consequently, refined surimi consisting of salt-soluble proteins in a high concentration can be obtained by diluting the mixture with water and then dewatering the resulting precipitate.

While on the other hand, in the present invention, water containing the water-soluble proteins obtained from the above water-washing stage and that resulting from the above salt solution-treating stage are respectively recovered and heated thereby denaturing and coagulating the water-soluble proteins. The coagulates obtained by heating the water-soluble proteins are then added to and compounded with the refined surimi consisting of the above salt-soluble proteins (myofibril) to prepare raw materials for the production of the fish meat jelly products.

The proteins contained in the solids in the effluent from the water washing treatment generally amount to about 40% of total proteins of the fish meat (determined by the biuret method) and 70–75% of the proteins in the effluent can be heat-coagulated according to the present invention. Thus, the water-soluble proteins recovered from the wash effluent amount to about 30% of the total proteins of the fish meat.

Nitrogen-containing low molecular weight compounds such as nucleic acids, amino acids, peptides and the like contained in the solid contents of the wash effluent are not recovered.

In the present invention, as described above, the surimi yield can remarkably be improved since the water-soluble proteins, which have hitherto been discarded, are recovered and coagulated with heating and the resultant coagulates are compounded with the salt-soluble protein fractions. Thus, compounded surimi was produced, according to the present invention, by compounding the refined surimi prepared by removing the water-soluble protein fractions from raw material fish with water-soluble proteins denatured with heating. The compounded surimi thus produced was then used as a raw material and Kamaboko products were produced therefrom according to the method specified by Japan Frozen Fish Association for evaluating frozen surimi. The test results for the estimation of Kamaboko quality are shown in the following tables 1 and 2. The results obtained by the ordinary process and those by the process wherein water-soluble proteins not denaturated with heating were incorporated and compounded as recovered with the refined surimi are also shown for comparison in table 1 and table 2 respectively.

The above test method consists, generally, of adding 5% by weight of sucrose and 0.2% by weight of a polyphosphate to raw material surimi to adjust the water content to 80%, thereafter, kneading same for 15 minutes while adding 2.6% by weight of common salt, further kneading for 15 minutes while adding 7% starch, packing the kneaded products into a tube and then heating the same at 90° C. for 30 minutes to produce Kamaboko.

Table 1

| Raw material fish | Present invention | | Ordinary process | |
|---|---|---|---|---|
| | jelly strength (g) | folding test | jelly strength (g) | folding test |
| Pollack (low freshness) | 430 | AA | 310 | C |
| Mackerel (low freshness) | 415 | AA | 240 | D |
| Merluza (refrigerated in dressing) | 450 | AA | 260 | D |
| Packfic hake (refrigerated in dressing) | 470 | AA | 250 | D |

Note
(1) Jelly strength was measured using a Okada Jelly Strength Meter.
(2) Folding test results were estimated with respect to Kamaboko sliced into 3 mm thickness based on the following standards:
AA — no cracking when folded into quarters.
A — partial cracking when folded into quarters
B — no cracking when folded into halves.
C — partial cracking when folded into halves.
D — impossible to fold into halves without breaking.

As will be apparent from the table above, according to the present invention, Kamaboko equal to the ordinary product can be obtained from the raw material fishes of types with which ordinary quality surimi can not be prepared by the ordinary water-washing process and even from raw material fish of low freshness.

Table 2

| Compounding ratio (to solids content by weight) | | | Surimi quality | |
|---|---|---|---|---|
| | Water-soluble proteins | | Kamaboko-forming ability (elasticity) | |
| Refined surimi (%) | not denatured (%) | heat denatured (%) | jelly strength (g) | folding test |
| 100 | 0 | | 460 | AA |
| 90 | 10 | | 340 | D |
| 80 | 20 | | 300 | D |
| 70 | 30 | | 280 | D |
| 50 | 50 | | 260 | D |
| 30 | 70 | | 250 | D |
| 0 | 100 | | 100 | D |
| 100 | | 0 | 460 | AA |
| 90 | | 10 | 460 | AA |
| 80 | | 20 | 450 | AA |
| 70 | | 30 | 420 | AA |
| 50 | | 50 | 350 | A |
| 30 | | 70 | 300 | C |
| 0 | | 100 | 280 | D |

Note: Values for the jelly strength and the folding test results have the same meanings as in the table 1. The raw materials used were Peru Merluza frozen in dressing. Water-soluble proteins used herein were prepared from the supernatant liquid resulted from the water-washing process by concentrating and dewatering through membrane filtration (undenatured proteins) and from the above heat-denatured proteins were obtained by heating at 90° C. for 5 minutes and to a similar concentration.

It will be understood from the results shown in the above table that while the surimi mixture compounded with the water-soluble fractions without heat-denaturation, recovered from the water-washing process shows such a significant degradation in texture that is is not suitable to the production of Kamaboko when the undenaturated proteins were added in 10% by weight to the refined surimi, the surimi mixture compounded with the heat-denaturated water-soluble proteins according to the present invention results in a Kamaboko capable of possessing sufficient jelly strength and passing the folding test even when 30% by weight of the denaturated proteins were added to the refined surimi.

Yields for the surimi (solid recovery) prepared according to the present invention were compared with those obtained by an ordinary method and the results are shown in Table 3.

Table 3

| | Recovered products | Kinds of raw materials fishes | | | |
|---|---|---|---|---|---|
| | | Pollack (%) | Mackerel (%) | Merluza (%) | Pacific hake (%) |
| Present invention | Refined surimi | 59 | 48 | 50 | 53 |
| | Denatured water-soluble proteins | 24 | 21 | 22 | 21 |
| | compounded surimi | 83 | 69 | 72 | 74 |
| Ordinary process | Water-washed surimi | 68 | 56 | 59 | 57 |

Note: Values (%) in the above table show the ratio of the recovered products to the total solids content of in the strained meat of the raw fish. Pollack and mackerel were used in their raw state and merluza was used as refrigerated in dressing.

It is apparent from the above table that the compounded surimi obtained by the process of the present invention has better quality as a raw material for Kamaboko, as well as showing a higher yield when compared with that obtained by the ordinary water-washing method. Moreover, the compounded surimi according to this invention can be preserved as refrigerated surimi by adding 5–10% by weight of saccharides and 0.2% by weight of polyphosphoric acid salts. The test results for the estimation of Kamaboko quality made from the compounded surimi, preserved at a temperature of −30° C. for three months, are shown in Table 4.

Table 4

| Raw material fish | Before preservation | | After preservation | |
|---|---|---|---|---|
| | jelly strength (g) | folding test | jelly strength (g) | folding test |
| Pollack | 430 | AA | 425 | AA |
| Mackerel | 415 | AA | 420 | AA |
| Merluza | 450 | AA | 440 | AA |
| Pacific hake | 470 | AA | 465 | AA |

Note:
Jelly strength and folding test were measured in the same manner as mentioned in connection with Table 1.

The foregoing show that, according to the present invention, it is possible to provide a high quality surimi from fish meat of various fishes and even from fish meat of low freshness, which surimi is suitable for use as a raw material for the production of fish meat jelly products and the like.

This invention will now be further described by the examples below but the invention is no way limited only to these examples.

EXAMPLE 1

Fish meat was taken from pollacks by an ordinary method which had been ice-stored for ten days after being caught and strained to obtain 10 kg strained meat (87% water content). 20 kg water was added thereto and it was minced in a colloid mill and separated into supernatant liquid and precipitate through a continuous centrifugal separation at 3000×g. Similar water treatment was repeated twice for the precipitate. The supernatant liquid from the water-washing was heated at 90° C. for 5 minutes and separated through continuous centrifugal separation at 2000×g to obtain 1150 g heated coagulates (83% water content).

7 kg of the precipitate from the wash water was mixed with 7 kg 0.5 M NaCl solution and 205 g NaCl and mixed in a colloid mill. 01 N-NaOH was further added to adjust the pH to 7.5–7.8. The mixture was stirred for one hour at 7° C., thereafter, 56 kg water was added and the pH was adjusted to 6.9–7.0 by the addition of 0.05 N-HCl. After standing for 30 minutes, the precipitate was recovered in a continuous centrifugal separator at 3,000×g to obtain 5,100 g refined surimi (85% water contents).

The supernatant liquid separated was treated in the same way as the foregoing supernatant liquid from the water-washing to obtain 690 g heated coagulates (83% water content).

The supernatant liquid (a diluted salt solution) left after the separation of the heated coagulates was concentrated by a factor of five and used in the succeeding salt solution-treatment for the precipitate from the water-washing.

To 5100 g refined surimi thus prepared, were added 1840 g heat coagulates of the above water-soluble proteins and further 350 g sucrose and 14 g polyphosphoric acid salts and the mixture was thoroughly compounded to obtain 7304 g (80.5% water contents) compounded surimi.

26 g common salt and 70 g starch were added to and kneaded with 1 kg of the above surimi and then packed into a tube, which was then heated at 90° C. for 30 minutes. The Kamaboko product thus produced had a jelly strength of 430 g and was estimated as AA in the folding test.

EXAMPLE 2

Fish meat was taken by an ordinary method from mackerels stored in ice for 5 days after being caught and strained to obtain 10 kg strained meat (87% water content). They were then treated in the same way as in Example 1 to obtain 3900 g refined surimi (84% water content) and 1700 g heated coagulates of water-soluble proteins (84% water content).

Both of the above fractions were mixed and further compounded together completely while adding 280 g sucrose and 11 g polyphosphoric acid salt to obtain 5891 g compounded surimi (80% water content).

26 g common salt and 70 g starch were added to and kneaded with 1 kg of the above compounded surimi and then packed into a tube, which was then heated at 90° C. for 30 minutes. The Kamaboko product thus produced had a jelly strength of 415 g and was estimated as AA in the folding test.

EXAMPLE 3

Refrigerated merluza in dressing was thawed to collect the fish meat by an ordinary method and strained to obtain 10 kg strained meat (88% water content). They were then treated in the same way as in Example 1 to obtain 4000 g refined surimi (85% water content) and 1650 g heated coagulates (84% water).

Both of the fractions were mixed and further compounded together completely while adding 280 g sucrose and 11 g polyphosphoric acid salt to obtain 5941 g compounded surimi (80% water content).

26 g common salt and 70 g starch were added to and kneaded with 1 kg of the compounded surimi and packed into a tube, which was then heated at 90° C. for 30 minutes. The Kamaboko product thus produced had a jelly strength of 415 g and was estimated as AA in the folding test.

EXAMPLE 4

Pacific hake refrigerated in dressing was thawed to collect the fish meat by an ordinary method and strained to obtain 10 kg strained meat (87% water content). The meat was then treated in the same way as in Example 1 to obtain 4600 g refined surimi (85% water content) and 1700 g heated coagulates of soluble proteins (84% water content).

Both of the fractions were mixed and further compounded together completely while adding 315 g sucrose and 12 g polyphosphoric acid salt to obtain 6627 g compound surimi (80.5% water content).

26 g common salt and 70 g starch were added to and kneaded with 1 kg of the compounded surimi and packed into a tube, which was then heated at 90° C. for 30 minutes. The Kamaboko product thus produced had a jelly strength of 470 g and was estimated as AA in the folding test.

What is claimed is:

1. A process for producing surimi suitable for the production of fish meat jelly products which comprises the steps of:
   (a) mincing fresh raw fish meat to convert the myofibrils present therein into a sol;
   (b) washing the sol with a sufficient amount of water to remove water soluble proteins;
   (c) dewatering the sol after washing;
   (d) mixing the dewatered sol with a sufficient amount of a salt solution to solubilize salt-soluble proteins;
   (e) diluting the mixture from (d) with a sufficient amount of water to form a precipitate;
   (f) dewatering the precipitate to recover the precipitate;
   (g) heating water effluent from step b) to coagulate water-soluble proteins contained therein; and
   (h) compounding the obtained protein coagulate with the recovered precipitate to obtain the surimi.

2. The process as defined in claim 1, wherein said salt solution is selected from the group consisting of an aqueous solution of sodium chloride, an aqueous solution of potassium chloride and brine water.

3. The process as defined in clam 1, wherein said mixture has an ionic strength of about 0.46–0.6 and a pH value of about 7.0–8.0.

* * * * *

UNITED STATES PATENT AND TRADEMARK OFFICE
CERTIFICATE OF CORRECTION

PATENT NO. : 4,181,749
DATED : January 1, 1980
INVENTOR(S) : Hiroshi NIKI et al

It is certified that error appears in the above-identified patent and that said Letters Patent are hereby corrected as shown below:

Column 1, Assignee, change "SNOW BAND MILK PRODUCTS CO., LTD." to --SNOW BRAND MILK PRODUCTS CO., LTD.--

Signed and Sealed this

Tenth Day of June 1980

[SEAL]

Attest:

SIDNEY A. DIAMOND

Attesting Officer

Commissioner of Patents and Trademarks